United States Patent
Porter

(10) Patent No.: US 10,532,577 B1
(45) Date of Patent: Jan. 14, 2020

(54) UNITARY INK TANK FOR PRINTER SYSTEM

(71) Applicant: ELECTRONICS FOR IMAGING, INC., Fremont, CA (US)

(72) Inventor: Christopher Andrew Porter, Weare, NH (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 16/182,795

(22) Filed: Nov. 7, 2018

(51) Int. Cl.

| B41J 2/175 | (2006.01) |
|---|---|
| B33Y 10/00 | (2015.01) |
| B33Y 30/00 | (2015.01) |
| B29C 64/40 | (2017.01) |
| B29C 64/112 | (2017.01) |
| B33Y 50/02 | (2015.01) |
| B29C 64/393 | (2017.01) |
| B29C 64/20 | (2017.01) |
| B33Y 70/00 | (2015.01) |
| B33Y 80/00 | (2015.01) |
| B29C 64/153 | (2017.01) |
| B29K 77/00 | (2006.01) |

(52) U.S. Cl.
CPC ......... *B41J 2/17559* (2013.01); *B29C 64/112* (2017.08); *B29C 64/153* (2017.08); *B29C 64/20* (2017.08); *B29C 64/393* (2017.08); *B29C 64/40* (2017.08); *B33Y 10/00* (2014.12); *B33Y 30/00* (2014.12); *B33Y 50/02* (2014.12); *B33Y 70/00* (2014.12); *B33Y 80/00* (2014.12); *B29K 2077/00* (2013.01); *B41J 2/17513* (2013.01); *B41J 2/17523* (2013.01); *B41J 2/17553* (2013.01)

(58) Field of Classification Search
CPC ............... B41J 2/17513; B41J 2/17523; B41J 2/17553; B41J 2/17559; B29C 64/153; B29C 64/20; B29C 64/393; B29C 64/40; B29C 64/112; G33Y 10/00; G33Y 30/00; G33Y 50/02; G33Y 70/00; G33Y 80/00; G05B 19/4099
See application file for complete search history.

(56) References Cited

U.S. PATENT DOCUMENTS

| 2013/0328228 A1* | 12/2013 | Pettis | F16M 11/12 264/40.1 |
|---|---|---|---|
| 2014/0324206 A1* | 10/2014 | Napadensky | G05B 19/41885 700/98 |
| 2015/0174826 A1* | 6/2015 | Murugesh | B29C 71/04 264/425 |

* cited by examiner

*Primary Examiner* — Anh T Vo
(74) *Attorney, Agent, or Firm* — Perkins Coie LLP

(57) ABSTRACT

The disclosed embodiments include a system for generating a unitary ink tank with a three-dimensional (3D) printing process. The system includes a processor configured to execute computer instructions that control 3D printing of an ink tank for a printer system. The system further includes a 3D printer coupled to the processor and configured to, based on the computer instructions, print the ink tank in accordance with a selective laser sintering process that sinters a powdered nylon material to form the ink tank as a unitary that includes a network of passageways configured to route ink of the printer system.

22 Claims, 5 Drawing Sheets

UNITARY INK TANK FOR PRINTER SYSTEM

TECHNICAL FIELD

The disclosed teachings relate to a technique for utilizing the capabilities of three-dimensional (3D) printing to create a unitary structure with at least one hollow element. The disclosed teachings more particularly relate to utilizing the capabilities of 3D printing to create a unitary ink tank that is chemically compatible with conventional inks and can have complex ink porting or passageways without needing a conventional sealing treatment.

BACKGROUND

Common types of printers include single-pass and shuttle-based inkjet printer systems. FIG. 1A illustrates an example of printing using a single-pass inkjet system. The printer includes one or more printheads that span the width of the printer, which is perpendicular to the direction of the paper transport. The printheads can access one or more ink tanks to print an image on media that advances under the printheads in a downstream direction. FIG. 1B illustrates an example of printing using a shuttle-based system. The printing involves multiple "passes" of a carriage including a printhead that moves perpendicular to the direction that the media advances over a printing area. With each pass, ink supplied from one or more ink tanks is deposited on a medium to print an image. Hence, the carriage can pass the printheads over media multiple times to produce a full-color image.

The printheads of inkjet printers eject drops of ink through small nozzles onto media. Each drop of ink forms a printed dot on media. A printed image is formed from numerous printed dots. In some instances, the ink is obtained from one or more ink tanks. For example, an inkjet printer may have a primary ink tank to store ink and a secondary (or auxiliary) ink tank that can supply the primary ink tank with ink when necessary. The secondary ink tank can feed the primary ink tank with ink when the level of ink in the primary ink tank becomes insufficient (e.g. below a given level of ink).

A secondary ink tank typically includes an arrangement of complex ink porting or passageways for routing ink of the inkjet printer. A process for manufacturing a secondary ink tank involves assembling several component parts that fit together to collectively form the secondary ink tank. The secondary ink tank can have various leak points where the component parts fit together imperfectly. One way to mitigate this problem is to subject the secondary ink tank to a sealing process that seals any gaps between the component parts of the secondary ink tank. However, the typical sealing process complicates an already complex, burdensome, and cost-prohibitive manufacturing process that does not result in a reliably functional ink tank.

Accordingly, there is a need for an improved process of manufacturing a functionally reliable ink tank that has complex ink porting/passageways and other cavities. The ink tank should have a reduced number of component parts and resulting leak points, which are otherwise common in ink tanks that are produced according to industry standard machine practices.

SUMMARY

Introduced here is at least one system, process, and unitary structure. The at least one system is for generating a unitary ink tank with a three-dimensional (3D) printing process. The system includes a processor configured to execute computer instructions that control 3D printing of the unitary ink tank for a printer system. The system further includes a 3D printer coupled to the processor and configured to, based on the computer instructions, print the unitary ink tank in accordance with a selective laser sintering process that sinters a powdered nylon material to form the unitary ink tank including a network of passageways configured to route ink of the printer system.

The disclosed embodiments also include a unitary structure, which includes a continuous body formed in accordance with an additive manufacturing (AM) process of a 3D printing process. The unitary structure includes one or more cavities configured to store a fluid in each of the one or more cavities, and one or more passageways of the unitary structure configured to route fluid from the one or more cavities. In some embodiments, the unitary structure is a unitary ink tank, the fluid is an ink, and the ink is routable to one or more printheads of a printer system. In some embodiments, the unitary ink tank is a secondary ink tank configured to supply ink to a primary ink tank of the printer system.

In some embodiments, the unitary ink tank has a network of passageways that enable flows of different inks from the cavities to respective printheads of a printer system. In some embodiments, each passageway is sloped to mitigate fluid entrapment in the unitary ink tank.

In some embodiments, the AM process is a selective laser sintering process such that the unitary ink tank consists of a powdered material sintered with a laser to form a continuous structure. In some embodiments, the powdered material comprises at least one of a nylon or a polyamide. In some embodiments, the powdered material is a glass filled nylon material, which, when sintered to form the unitary ink tank, provides sufficient mechanical stiffness, heat resistance, and dimensional stability to enable operation of the unitary ink tank to supply ink in a printing process of the printer system. In some embodiments, the powdered material is chemically compatible with inks that are used by conventional ink tanks that are assembled and sealed to prevent leakage.

In some embodiments, the continuous structure has a uniform wall thickness to maintain mechanical operability in each of a vacuum environment and a pressurized environment. In some embodiments, the wall thickness is approximately 3 millimeters.

In some embodiments, each passageway and storage cavity has a radius of curvature that is sufficient to mitigate fluid entrapment. In some embodiments, the radius of curvature is approximately 1 to 6 millimeters.

In some embodiments, the one or more passageways are interweaved to enable providing numerous inks to any single or combination of printheads of the printer system without needing secondary sealing of the passageways.

The disclosed embodiments also include a unitary ink tank formed by a process. The process includes processing computer instructions to control a printing process causing a 3D printer to print a unitary ink tank for a printer system, and printing, based on the computer instructions, the unitary ink tank in accordance with an AM process where the unitary ink tank is formed from powdered material and includes a network of passageways configured to route ink of the printer system.

In some embodiments, the process further includes processing the unitary ink tank with a machining process to create one or more critical sealing surfaces. In some embodiments, the process further includes processing the unitary ink tank with a thermoset impregnation resin to mitigate effects of porosity of the unitary ink tank.

In some embodiments, the computer instructions include a 3D model of the unitary ink tank, and the unitary ink tank is formed of sintered powdered material in accordance with selective laser sintering of the AM process. For example, the process can further include aiming the laser automatically at points in space defined by the 3D model to form the unitary ink tank by binding the powder material.

Other aspects of the disclosed embodiments will be apparent from the accompanying figures and detailed description.

This Summary is provided to introduce a selection of concepts in a simplified form that is further explained below in the Detailed Description. This Summary is not intended to identify key features or essential features of the claimed subject matter, nor is it intended to be used to limit the scope of the claimed subject matter.

DETAILED DESCRIPTION

Figure 1A:
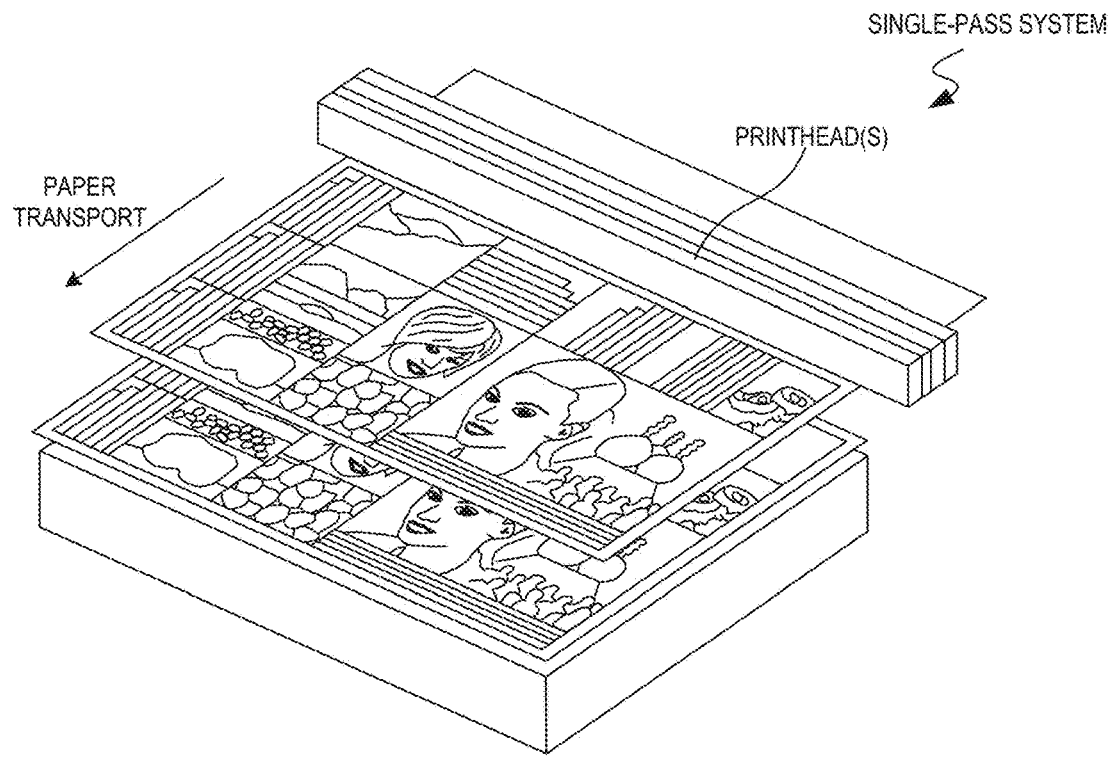
FIG. 1A illustrates an example of printing using a single-pass inkjet system.
Figure 1B:
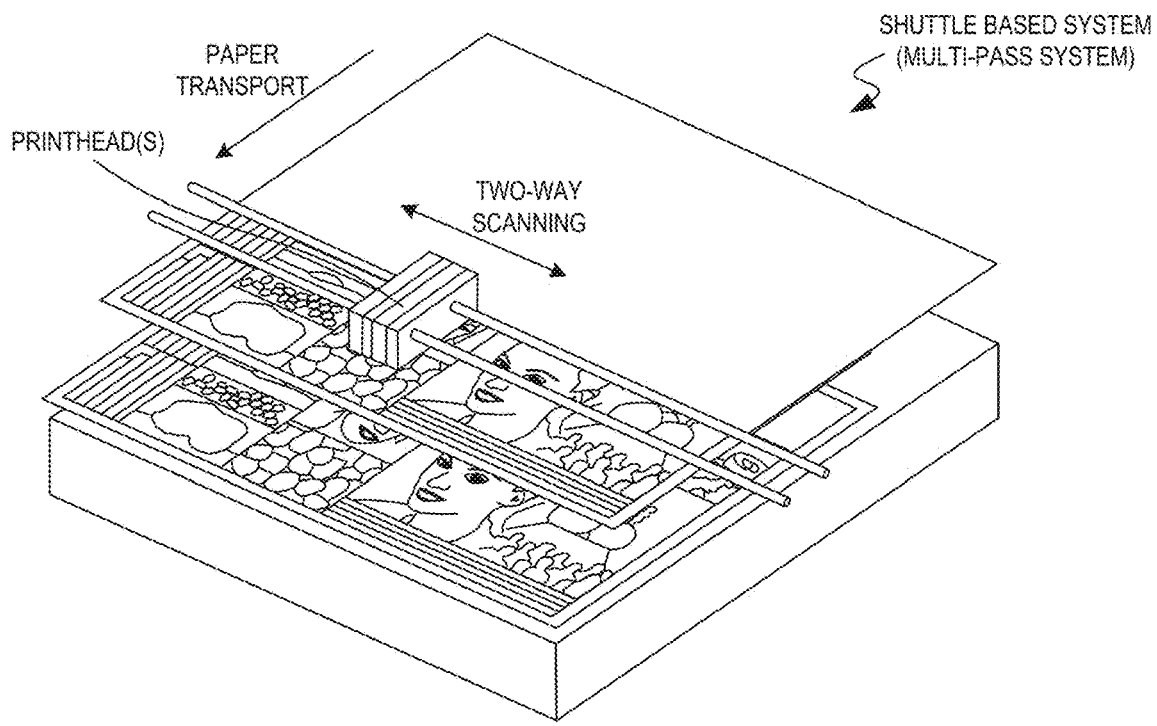
FIG. 1B illustrates an example of printing using a shuttle-based inkjet system.

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of terminology used herein is only for describing embodiments and is not intended to limit the scope of the disclosure. Where context permits, words using singular or plural form may also include the plural or singular form, respectively.

As used herein, unless specifically stated otherwise, terms such as "processing," "computing," "calculating," "determining," "displaying," "generating" or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, the terms "connected," "coupled," or variants thereof, mean any connection or coupling, either direct or indirect, between two or more elements. The coupling or connection between the elements can be physical, logical, or a combination thereof.

The disclosed embodiments relate to a system, apparatus, and process for manufacturing a unitary structure of an ink tank for a printer system (also referred to as a "unitary ink tank"). As used herein, the term "unitary structure" refers to a single, undivided structure that is continuous and seamless. The disclosed manufacturing process enables creating a unitary ink tank that has a complex network of ink passageways while reducing the number of parts and resulting leak points that are common with standard machine practices. The disclosed embodiments include a process for producing a secondary ink tank by three-dimensional (3D) printing and the resulting product of that process.

Although the disclosure primarily refers to a "unitary ink tank," which suggests a single undivided structure, embodiments include a structure with at least one unitary component that is assembled with other components to form the unitary ink tank. Overall, reducing the number of components that form an ink tank provides many of the advantages of a completely unitary ink tank. For example, an ink tank that is assembled from two unitary components would offer improved performance over an ink tank that is assembled of three unitary components or an ink tank that is an assembly of a collection of parts including at least one unitary structure the forms the majority of the ink tank. Accordingly, in some embodiments, a "unitary ink tank" may refer to a structure with a majority (e.g., more than 50%) formed of a single unitary component or a substantial majority (e.g., more than 70%) formed of a unitary component manufactured according to the methods described herein.

The term "3D printing" typically refers to a process that deposits a binder material onto a powder bed with inkjet printheads, layer-by-layer. However, the term may encompass a wider variety of additive manufacturing techniques. The US and global technical standards use the official term "additive manufacturing" (AM) in this broader sense. In general, 3D printing refers to any of various processes in which material is joined or solidified under computer control to create a 3D object, with material being added together, such as liquid molecules or powder grains being fused together. Objects can be of almost any shape or geometry and typically are produced using digital model data from a 3D model or another electronic data source such as an additive manufacturing file (AMF), usually in sequential layers. There are many related but different technologies, like stereolithography (SLA) or fused deposit modeling (FDM). Thus, unlike material removed from a stock in a conventional machining process, 3D printing or AM builds a 3D object from a computer-aided design (CAD) model or AMF file, usually by successively adding material layer-by-layer.

The term "additive manufacturing" denotes material being added together in any of various ways. In contrast, the term "subtractive manufacturing" refers to machining processes with material removal. Other terms that can be used as AM synonyms or hypernyms include desktop manufacturing, rapid manufacturing, and on-demand manufacturing. The term subtractive does not replaced the term machining; instead the term complements machining as a removal method.

Although techniques like injection molding can be less expensive for manufacturing polymer products in high quantities, AM can be faster, more flexible and less expensive when producing certain parts. Some general principals of 3D printing include modeling, printing, and finishing. 3D models may be created with a CAD package, via a 3D scanner, or by a digital camera and photogrammetry software. Before printing a 3D model from its corresponding instruction file, the file should be examined for errors by the electronic controller and repaired to produce a 3D object. Once completed, the instruction file could be processed by software that converts the model into a series of thin layers and produces code files containing instructions tailored to a specific type of 3D printer (e.g., FDM printers). The code files can then be printed with 3D printing client software, which loads the code, and uses it to instruct the 3D printer during the 3D printing process.

Printer resolution describes layer thickness and X-Y resolution in dots per inch (dpi) or micrometers (μm). Typical layer thickness is around 100 μm (250 DPI), although some machines can print layers as thin as 16 μm (1,600 DPI). X-Y resolution is comparable to that of laser printers. The particles (3D dots) are around 50 to 100 μm (510 to 250 DPI) in diameter. For that printer resolution, specifying a mesh resolution of 0.01-0.03 millimeter (mm) and a chord length ≤0.016 mm generate an optimal STL output file for a given model input file.

Construction of a model typically takes anywhere from several hours to several days, depending on the method used, and the size and complexity of the model. Additive systems can reduce this time to a few hours, although it varies widely depending on the type of machine used and the size and number of models being produced simultaneously. Although the printer-produced resolution is sufficient for many applications, printing a slightly oversized version of a desired object in standard resolution and then removing material with a higher-resolution subtractive process can achieve greater precision.

Some AM techniques can use multiple types of materials in the course of constructing parts. These techniques can print in multiple colors and color combinations simultaneously. Some printing techniques require internal supports to be built for overhanging features during construction. These supports must be mechanically removed or dissolved upon completion of the print.

There are a variety of 3D printing processes and 3D printers, and a large number of additive processes are available. A central difference between processes are the way layers are deposited to create parts and in the materials that are used. Each method has its own advantages and drawbacks, which is why some vendors offer a choice of powder and polymer for the material used to build a 3D object. Other vendors sometimes use standard, off-the-shelf techniques to produce a durable prototype. Other considerations in choosing a 3D printer are generally speed, costs of the 3D printer, of the printed prototype, choice and cost of the materials, and color capabilities.

ISO/ASTM52900-15 defines seven categories of AM processes: binder jetting, directed energy deposition, material extrusion, material jetting, powder bed fusion, sheet lamination, and vat photopolymerization. Some methods melt or soften the material to produce the layers. In fused filament fabrication (also known as fused deposition modeling (FDM)), a 3D model or part is produced by extruding small beads or streams of material which harden immediately to form layers. A filament of thermoplastic, metal wire, or other material is fed into an extrusion nozzle head, which heats the material and turns the flow on/off. FDM is somewhat restricted in the variation of shapes that may be fabricated. Another technique fuses parts of a layer and then moves upward in the working area, adding another layer of granules and repeating the process until the object is built-up.

Laser sintering techniques include selective laser sintering (SLS), with both metals and polymers, and direct metal laser sintering. Selective laser melting does not use sintering for the fusion of powder granules but will completely melt the powder using a high-energy laser to create fully dense materials in a layer-wise method that has mechanical properties similar to those of conventional manufactured metals. Electron beam melting (EBM) is a similar type of AM technology for metal parts (e.g. titanium alloys). EBM manufactures parts by melting metal powder layer by layer with an electron beam in a high vacuum. Another method consists of an inkjet 3D printing system, which creates the model one layer at a time by spreading a layer of powder (e.g., plaster, resins) and printing a binder in the cross-section of the part using an inkjet-like process. With laminated object manufacturing, thin layers are cut to shape and joined together.

Other methods cure liquid materials using different sophisticated technologies, such as stereolithography. Photopolymerization is used in stereolithography to produce a solid part from a liquid. Inkjet printer systems may spray photopolymer materials onto a build tray in ultra-thin layers until the part is completed. Each photopolymer layer is cured with UV light after it is jetted, producing fully cured models that can be handled and used immediately, without post-curing. Ultra-small features can be made with the 3D micro-fabrication technique used in multiphoton photopolymerization. Due to the nonlinear nature of photo excitation, the gel is cured to a solid only in the places where the laser was focused while the remaining gel is then washed away. Feature sizes of under 100 nm are easily produced, as well as complex structures with moving and interlocked parts. Yet another approach uses a synthetic resin that is solidified using LEDs.

In mask-image-projection-based stereolithography, a 3D digital model is sliced by a set of horizontal planes. Each slice is converted into a two-dimensional mask image. The mask image is then projected onto a photocurable liquid resin surface and light is projected onto the resin to cure it in the shape of the layer. Continuous liquid interface production begins with a pool of liquid photopolymer resin. Part of the pool bottom is transparent to ultraviolet light, which causes the resin to solidify. The object rises slowly enough to allow resin to flow underneath and maintain contact with the bottom of the object. In powder-fed directed-energy deposition, a high-power laser is used to melt metal powder supplied to the focus of the laser beam. The powder fed directed energy process is similar to SLS, but the metal powder is applied only where material is being added to the part at that moment.

The AM systems on the market broadly range in price and are employed in industries including aerospace, architecture, automotive, defense, and medical industries. Therefore, 3D printing can involve numerous different methods, 3D printers, and techniques for creating almost any 3D object by an AM process. However, a skilled person in the art would understand that there are many drawbacks to 3D printed objects. For example, the function of a 3D printed object could be impaired because the materials that from the 3D printed object are not suitable for that function in a larger system. Therefore, 3D printing is not a straightforward application to produce any 3D object for any purpose.

For example, creating a 3D printed secondary ink tank for a printer system is not a straightforward application of 3D printing. A secondary ink tank is a complex structure that includes a network of passageways for routing ink to a primary ink tank of an inkjet printer. Conventional techniques for creating the network of passageways involve taking a solid body of material, drilling an intersection of holes, and plugging the ends of the holes with another body such as a ball or self-sealing screw. The component parts of the ink tank structure are assembled together by using a sealing member (e.g., O-rings, gaskets) between them. However, this results in many potential leak points and lacks structural durability. Further, existing inks for inkjet printers that would be contained in ink tanks have chemical properties that could be corrosive to common materials used in 3D printing. In another example, a vacuum or pressurized environment that contains the 3D printed secondary ink tank could affect the durability and functionality of the ink tank.

The disclosed embodiments overcome the aforementioned drawbacks by utilizing capabilities of 3D printing to produce a unitary structure. The unitary structure has one or more cavities. For example, the unitary structure can be a unitary ink tank that is chemically compatible with inks used by conventional ink tanks. The unitary ink tank can have a complex network of passageways and ink reservoir cavities. The formation of the unitary ink tank does not require a separate sealing treatment to mitigate leak points.

Figure 2:
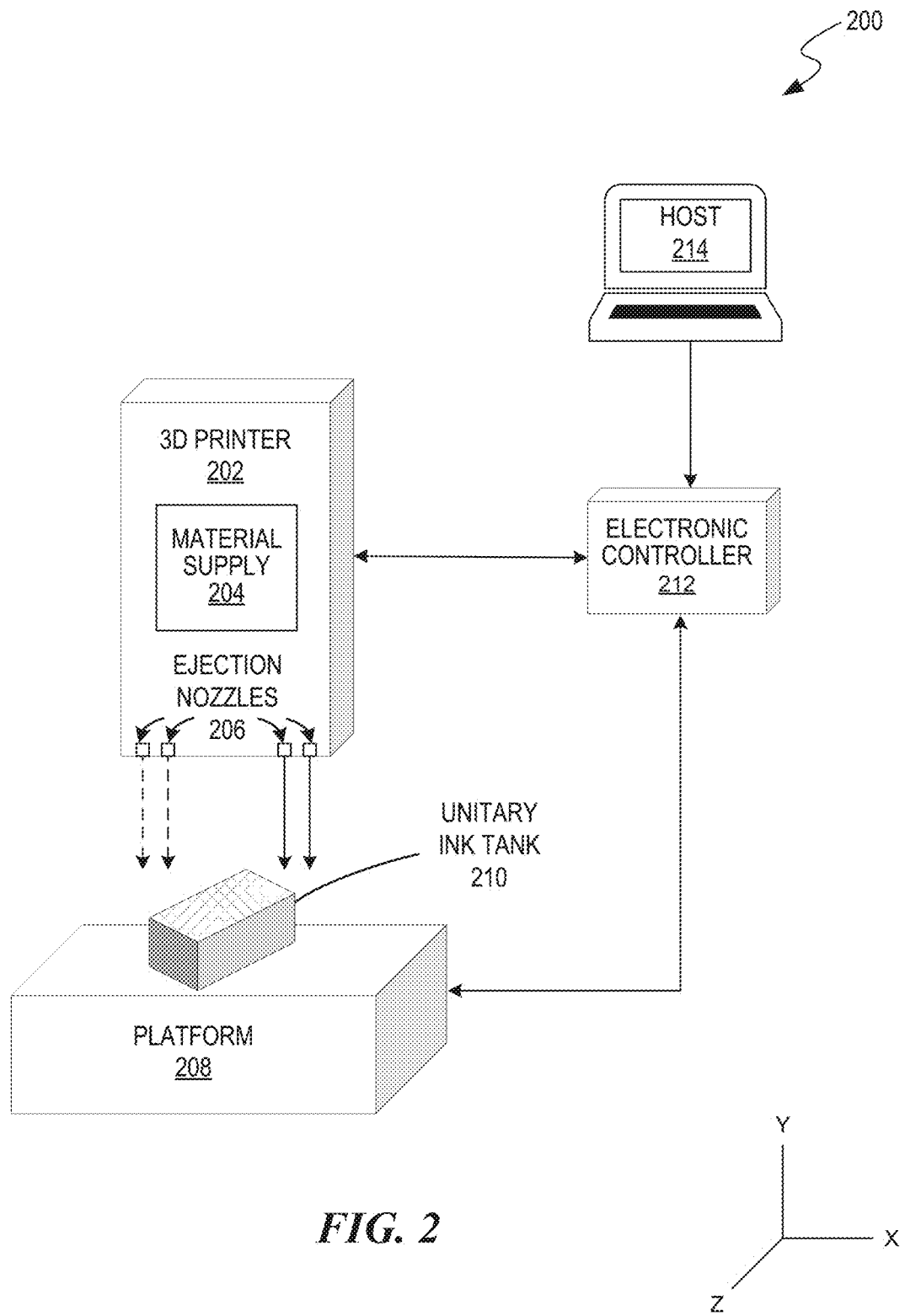
FIG. 2 illustrates a block diagram of a system for creating a unitary ink tank with a three-dimensional (3D) printer according to some embodiments of the present disclosure.

FIG. 2 illustrates a block diagram of a system for creating a unitary ink tank with a 3D printer according to some embodiments of the present disclosure. The system 200 includes a 3D printer 202, which has a material supply 204 that can feed material to ejection nozzles 206. The ejection nozzles 206 can eject material onto the platform 208 to print a unitary ink tank 210 on the platform 208. The system 200 also includes an electronic controller 212 (e.g., one or more processors) for controlling operations of the 3D printer 202 and the platform 208. The 3D printer 202 can include a mechanical drive mechanism (not shown) to move the ejection nozzles 206 over the platform 208 under the direction of the electronic controller 212. Accordingly, the ejection nozzles 206 are movable relative to the platform 208 to print the unitary ink tank 210. In some instances, the platform 208 has a mechanical drive mechanism (not shown) to move the platform 208 relative to the ejection nozzles 206, to print the unitary ink tank 210.

The electronic controller 212 receives computer instructions including print data (e.g., a 3D model) from a host device 214. The electronic controller 212 processes the print data into control information and object data. The electronic controller 212 coordinates the relative position of the ejection nozzles 206 to position the ejected material over the platform 208, to create the unitary ink tank 210 in accordance with the received print data.

Figure 3:
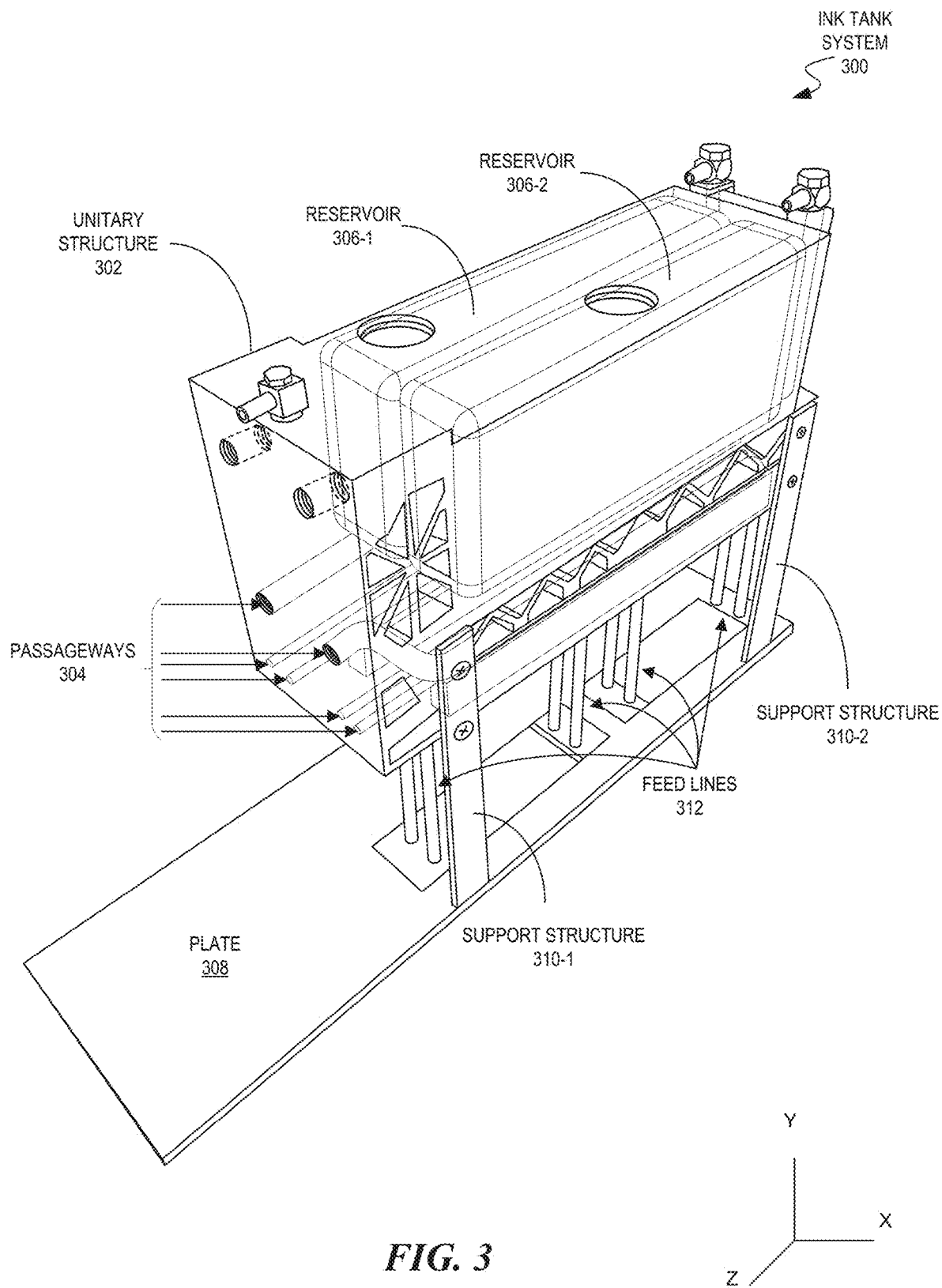
FIG. 3 illustrates an ink tank system including a unitary structure generated in accordance with a 3D printing process according to some embodiments of the present disclosure.

FIG. 3 illustrates an ink tank system 300 including a unitary structure 302 generated in accordance with a 3D printing process according to some embodiments of the present disclosure. The unitary structure 302 reduces potential leak points because it eliminates the need for assembling numerous component parts to form cavities for storing and routing ink to printheads of a printer. Instead, the body of the unitary structure 302 forms the passageways 304 and reservoirs 306 to store and route ink, respectively. The unitary structure 302 is secured to the plate 308 with support structures 310. The ink tank system 300 further includes feed lines 312 that feed ink to the unitary structure 302.

An additional treatment may be necessary to seal the surface of the unitary structure 302. Specifically, the unitary structure 302 is porous due to the sintering process of 3D printing. Therefore, making the unitary structure 302 impermeable to fluid may require a post printing process to seal the surface of the unitary structure so that it can properly function to contain inks for printers. The material(s) use to seal the unitary structure 302 must be compatible with the inks used by the printers.

The benefits of a unitary ink tank include mitigating fluid (e.g., liquid, air) entrapment because the unitary structure has sloped or pitched passageways. A person skilled in the art would understand that the network of passageways of an ink tank could vary and, as such, only some non-limiting examples are shown in FIG. 3. In some embodiments, a gradual change of a 2D cross-section eliminates sharp edges, which are common with standard machining practices where air can become pinned. Said a different way, this refers to morphing a profile or shape into another. For example, a crescent passageway can morph into a circular passageway. This type of feature cannot be machined using existing machining tools and practices.

In some embodiments, each passageway and/or storage cavity has a radius of curvature that is sufficient to mitigate fluid entrapment. An example of a suitable radius of curvature is approximately 1 to 6 millimeters. In some embodiments, the use of complex curves and sweeps allow interweaving of passageways to provide more than one color from the unitary ink tank to any single or combination of printheads.

In some embodiments, the unitary ink tank has a wall thickness that is uniform throughout its continuous structure to maintain mechanical operability in each of a vacuum environment and a pressurized environment. An example of a suitable wall thickness is approximately 3 mm. Thus, the ink tank can maintain a 3 mm wall thickness throughout the structure to achieve desired mechanical properties while maximizing the overall weight savings through AM. Further, the unitary ink tank has no sharp edges anywhere in the structure to reduce stress point concentrations.

Porosity is a common problem of 3D printed objects. For example, the porosity of a unitary ink tank could cause ink to leach out and/or allow colored inks contained in internal storage cavities to mix. In some embodiments, the porosity of the unitary ink tank is treated with a post-printing sealing process including application of a thermoset impregnation resin. In one example, the unitary ink tank is treated with an Imprex 95-1000AC anaerobic impregnation sealant by using a wet vacuum application and then cured at approximately 195 degrees Fahrenheit. The Imprex 95-1000AC impregnation sealant can seal porosity of cast and powdered metal components, works well with 3D printed objects, is easily washable from a surface of components, and is soluble in drinking water or deionized water. Once polymerized, the hardened resin exhibit superior chemical resistance and elevated temperature stability.

In some embodiments, critical external sealing surfaces are controlled through a post-printing machining process. That is, some critical surfaces cannot be printed reliably and therefore should be post machined in order to create desired features. This process lends its use to all current and future secondary ink tank designs.

Therefore, the disclosed embodiments utilize capabilities of 3D printing to create a unitary ink tank that is compatible with existing printer systems but offers a variety of benefits over conventional ink tanks. For example, a unitary ink tank can have complex structural features and remain chemically compatible with a variety of ink sets. Some of these complex structural features cannot be machined using any industry-standard practices for manufacturing ink tanks. Other benefits include a reduction in component parts, an elimination of costs for machining multiple parts that would be assembled and sealed, a reduction in potential leak points, and a reduction in weight of a printer carriage that holds the unitary ink tank.

Figure 4:
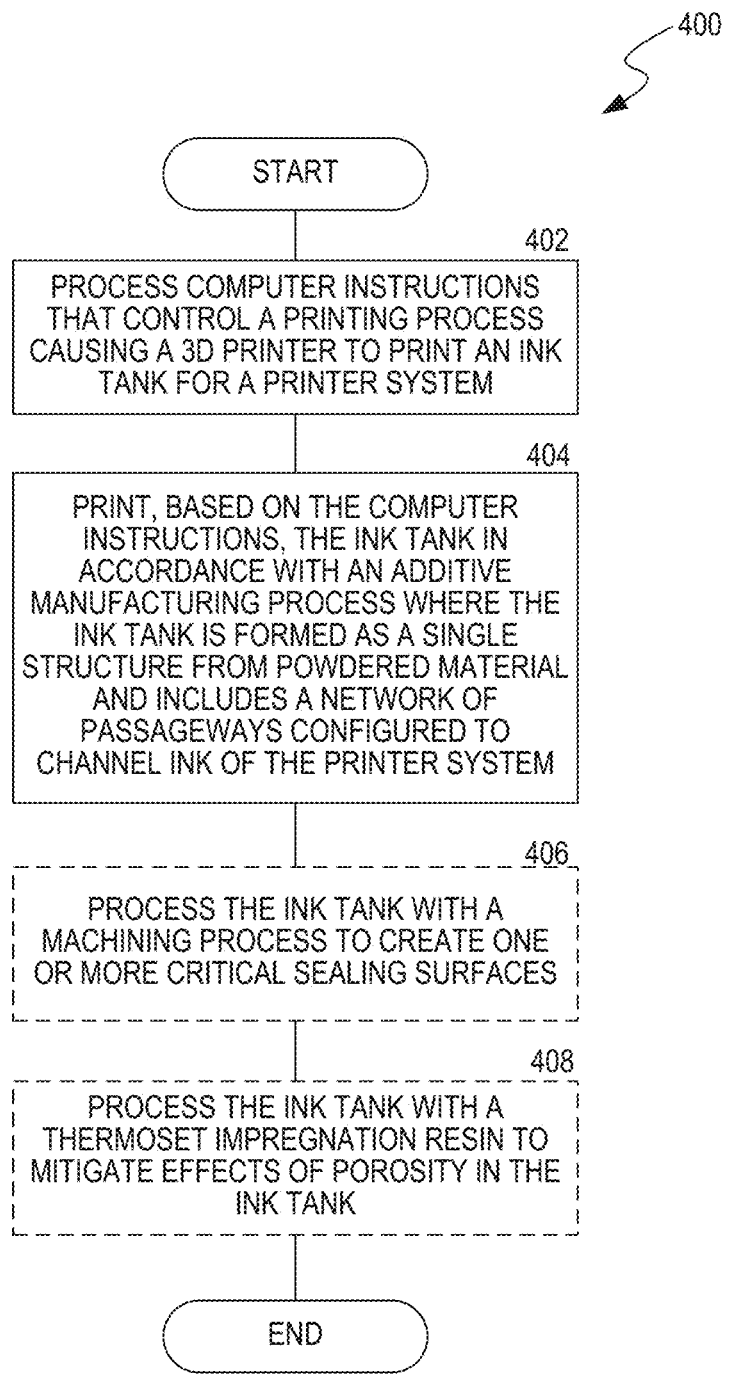
FIG. 4 is a flowchart that illustrates a process for utilizing the capabilities of 3D printing to create a unitary ink tank for a printer system according to some embodiments of the present disclosure.

FIG. 4 is a flowchart that illustrates a process for utilizing the capabilities of 3D printing to create a unitary ink tank for a printer system according to some embodiments of the present disclosure. In step 402, a controller coupled to a 3D printer receives and processes computer instructions that control a printing process causing a 3D printer to print an ink tank for a printer system. For example, a host computer can send a file with print data including a 3D model of the ink tank to the controller, which controls a 3D printer to create the ink tank in accordance with the print data. In some embodiments, the controller is part of or included in the 3D printer. The 3D model can include specifications for printing a secondary ink tank configured to supply ink to a primary ink tank of the inkjet printer.

In step 404, the 3D printer creates the ink tank based on the computer instructions. The ink tank is printed in accordance with an AM process where the ink tank is formed as a unitary structure from powdered material and includes a network of passageways configured to route ink to the inkjet printer. In some embodiments, the network of passageways and storage cavities include complex curves and sweeps that allow for interweaving of the passageways to enable providing several colored inks to any single or combination of printheads without needing to apply a separate sealing process to contain the inks in the ink tank and separate from one another.

The AM process is a selective laser sintering (SLS) that uses a laser as a power source to sinter powdered material (e.g., nylon, polyamide). In some embodiments, the selected material is a glass filled nylon 12 that provides sufficient mechanical stiffness, heat resistant, and is dimensionally stable when rendered as an ink tank. The material is chemically compatible with existing ink sets such that inks normally used in conventional ink tanks, which are assembled of component parts and sealed, can be used by the unitary ink tank.

In operation, the laser of the SLS process is aimed automatically at points in space as defined by the 3D model, binding the material together to create the unitary ink tank. SLS can produce complex geometries at a high resolution compared to other machining practices. This process is similar to direct metal laser sintering (DMLS). The two are instantiations of the same concept but differ in technical details understood by persons skilled in the art. A comparable concept is selective laser melting (SLM); however, in SLM a material is fully melted rather than sintered, which allows for creating structures with different properties (e.g., crystal, porosity). Other 3D printing processes like stereolithography (SLA) and fused deposition modeling (FDM), as described above, cannot produce the complex geometries of the unitary ink tank at the required resolution or must use materials that are not chemically compatible with conventional ink sets.

The disclosed process results in a unitary ink tank with improved properties or characteristics compared to conventional ink tanks. The benefits include ease of manufacturing and a reduction in possible leak points. Another benefit of the unitary structure created through AM is reduced weight compared to conventional ink tanks created with standard machining processes and overall reduced weight of a structure housing the unitary ink tank. In some embodiments, the unitary ink tank has a wall thickness that must be uniform at 3 mm throughout the entire structure to achieve desired mechanical properties for operation in both vacuum and pressurized environments.

In some embodiments, the unitary ink tank is created with sloped or otherwise pitched internal fluid passageways. This beneficially mitigates fluid entrapment of liquid or air in the unitary ink tank. A gradual change of 2D cross-section eliminates the need for sharp edges where fluid such as air can become pinned. A radius of curvature between 1-6 mm on all passageways and/or storage cavities can further mitigate fluid entrapment.

In optional step 406, the unitary ink tank undergoes a machining process to create one or more critical sealing surfaces. The critical sealing surfaces cannot be reliably 3D printed and, for example, instead must be controlled through another machining process. Hence, once identified, these surfaces (or areas) must have extra material added during the design of the 3D printed ink tank to allow for a subtractive machining process.

In optional step 408, the unitary ink tank is processed by applying a sealant to mitigate the effects of porosity. As previously discussed, porosity is a common problem in 3D printed structures. This can be controlled in different ways. The porosity of a secondary ink tank could cause ink to leach out of the ink tank and/or mix more than one ink color internally. In the disclosed embodiments, porosity can be controlled by applying a sealant such as an Imprex 95-1000AC anaerobic impregnation sealant. The sealant porosity in cast and powdered metal components, works well with 3D printed parts, is easily washed from the surface of components, and is soluble in drinking water or deionized water. Once polymerized, the hardened resin exhibits superior chemical resistance and elevated temperature stability.

Figure 5:
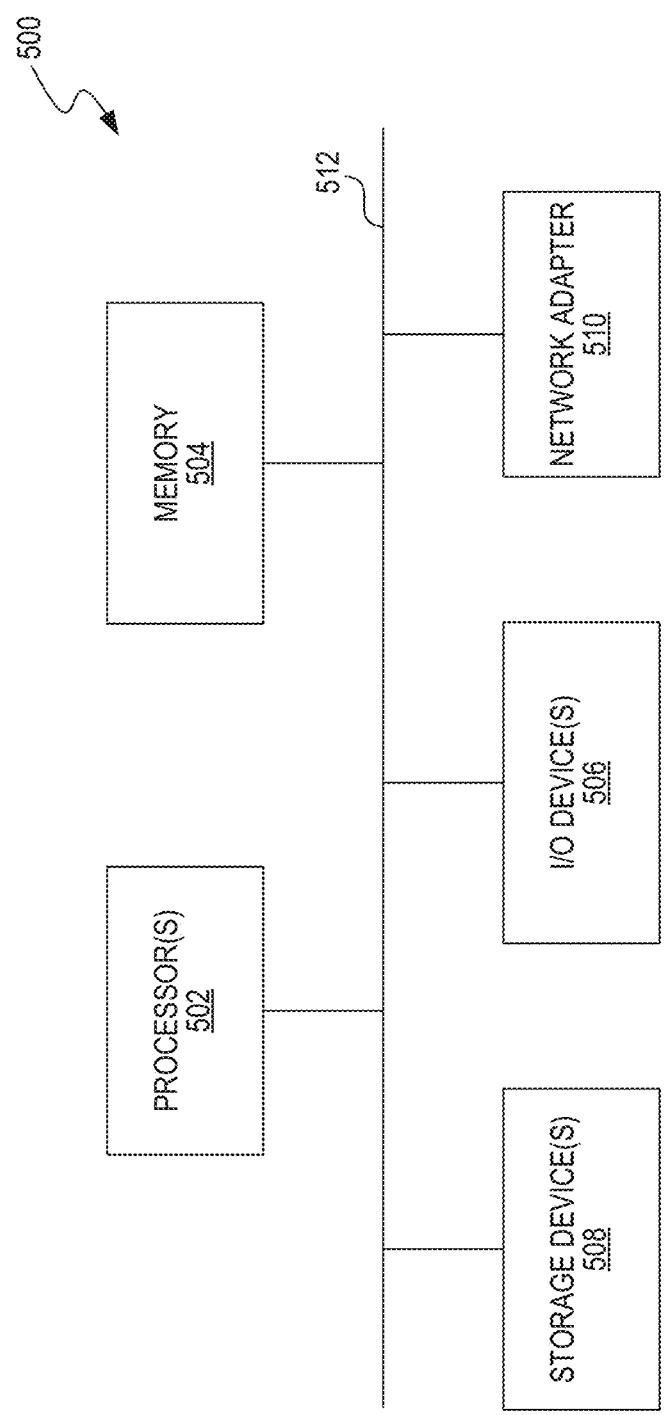
FIG. 5 is a block diagram of a computer operable to implement the disclosed technology according to some embodiments of the present disclosure.

FIG. 5 is a block diagram of a computer system 500 of the disclosed system operable to implement the disclosed technology according to some embodiments of the present disclosure. The computer system 500 may be a server computer; a client computer; a personal computer (PC); a user device; a tablet PC; a laptop computer; a personal digital assistant (PDA); a cellular telephone; an iPhone; an iPad; a Blackberry; a processor; a telephone; a web appliance; a network router; a switch or bridge; a console; a hand-held console; a (hand-held) gaming device; a music player; any portable, mobile, hand-held device or wearable device; or any machine capable of executing a set of instructions (sequential or otherwise) that specifies actions to be taken by that machine. In the disclosed embodiments, examples of the computer system 500 include components of the 3D printer 202, electronic controller 212, or host device 214.

The computer system 500 may include one or more central processing units ("processor(s)") 502, memory 504, input/output devices 506 (e.g., keyboard and pointing devices, touch devices, display devices), storage devices 508 (e.g., disk drives), and network adapters 510 (e.g., network interfaces) that are connected to an interconnect 512. The interconnect 512 is illustrated as an abstraction that represents any one or more separate physical buses, point-to-point connections, or both that are connected by appropriate bridges, adapters, or controllers. Therefore, the interconnect 512 may include, for example, a system bus, a peripheral component interconnect (PCI) bus or PCI-Express (PCI-E) bus, a HyperTransport or industry standard architecture (ISA) bus, a small computer system interface (SCSI) bus, a universal serial bus (USB), inter-integrated circuit (I2C) bus, or an Institute of Electrical and Electronics Engineers (IEEE) standard 1394 bus, also called "Firewire."

The memory 504 and storage devices 508 are computer-readable storage media that may store instructions that implement at least portions of the various embodiments. In addition, the data structures and message structures may be stored or transmitted via a data transmission medium (e.g., a signal on a communications link). Various communications links may be used (e.g., the Internet, a local area network, a wide area network, or a point-to-point dial-up connection). Thus, computer-readable media can include computer-readable storage media (e.g., "non-transitory" media) and computer-readable transmission media.

The instructions stored in memory 504 can be implemented as software and/or firmware to program the processor(s) 502 to carry out actions described above. In some embodiments, such software or firmware may be initially provided to the processor(s) 502 by downloading it from a remote system through the computer system 500 (e.g., via network adapter 510).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

A software program, when referred to as "implemented in a computer-readable storage medium," includes computer-readable instructions stored in memory (e.g., memory 504). A processor (e.g., processor 502) is "configured to execute a software program" when at least one value associated with the software program is stored in a register that is readable by the processor. In some embodiments, routines executed to implement the disclosed embodiments may be implemented as part of the Operating System (OS) software (e.g., Microsoft Windows®, Linux®) or a specific software application, component, program, object, module, or sequence of instructions, referred to as "computer programs."

As such, the computer programs typically comprise one or more instructions set at various times in various memory devices of a computer (e.g., computer system 500) and which, when read and executed by a at least one processor (e.g., processor(s) 502), cause the computer to perform operations to execute features involving the various aspects of the disclosure embodiments. In some embodiments, a carrier containing the aforementioned computer program product is provided. The carrier is one of an electronic signal, an optical signal, a radio signal, or a non-transitory computer-readable storage medium (e.g., the memory 504).

Operation of a memory device (e.g., memory 504), such as a change in state from a binary one to a binary zero (or vice-versa) may comprise a visually perceptible physical transformation. The transformation may comprise a physical transformation of an article to a different state or thing. For example, a change in state may involve accumulation and storage of charge or release of stored charge. Likewise, a change of state may comprise a physical change or transformation in magnetic orientation or a physical change or transformation in molecular structure, such as from crystalline to amorphous or vice versa.

Aspects of the disclosed embodiments may be described in terms of algorithms and symbolic representations of operations on data bits stored on memory. These algorithmic descriptions and symbolic representations generally include a sequence of operations leading to a desired result. The operations require physical manipulations of physical quantities. Usually, though not necessarily, these quantities take the form of electrical or magnetic signals capable of being stored, transferred, combined, compared, and otherwise manipulated. Customarily and for convenience, these signals are referred to as bits, values, elements, symbols, characters, terms, numbers, or the like. These and similar terms are associated with physical quantities and are merely convenient labels that are applied to these quantities.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not all necessarily referring to the same embodiment, nor are separate or alternative embodiments mutually exclusive of other embodiments. Moreover, various features are described, which may be exhibited by some embodiments and not by others. Similarly, various requirements are described, which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted; for example, using italics and/or quotation marks. The use of highlighting has no influence on the scope and meaning of a term, the scope and meaning of a term is the same, in the same context, whether or not it is highlighted. It will be appreciated that the same thing can be said in more than one way. One will recognize that "memory" is one form of a "storage" and that the terms may, on occasion, be used interchangeably.

Consequently, alternative language and synonyms may be used for any one or more of the terms discussed herein, and no special significance is to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The invention claimed is:

1. A system for generating a unitary ink tank with a three-dimensional (3D) printing process, the system comprising:
 a processor configured to execute computer instructions that control 3D printing of a unitary ink tank for a printer system; and
 a 3D printer coupled to the processor and configured to, based on the computer instructions, print the unitary ink tank in accordance with a selective laser sintering process that sinters a powdered nylon material to form the unitary ink tank as a continuous single structure that includes a network of passageways configured to route ink of the printer system.

2. A unitary ink tank formed by a process comprising:
 processing computer instructions that control a printing process causing a three-dimensional (3D) printer to print a unitary ink tank for a printer system; and
 printing, based on the computer instructions, the unitary ink tank in accordance with an additive manufacturing process where the unitary ink tank is formed as a continuous single structure from powdered material and includes a network of passageways configured to route ink of the printer system.

3. The process of claim 2 further comprising:
 processing the unitary ink tank with a machining process to create one or more critical sealing surfaces.

4. The process of claim 2 further comprising:
 treating the unitary ink tank with a resin to mitigate effects of porosity of the unitary ink tank.

5. The process of claim 2, wherein the computer instructions include a 3D model of the unitary ink tank.

6. The process of claim 5, wherein the unitary ink tank is formed of sintered powdered material in accordance with selective laser sintering of the additive manufacturing process.

7. The process of claim 6, wherein the computer instructions include a 3D model of the unitary ink tank and the printing comprises:
 aiming a laser automatically at points in space defined by the 3D model to form the unitary ink tank by binding the powdered material.

8. A unitary structure comprising:
 a continuous body formed in accordance with an additive manufacturing process and comprising:
  one or more cavities configured to store a fluid in each of the one or more cavities; and
  one or more passageways configured to route the fluid from the one or more cavities.

9. The unitary structure of claim 8, wherein the unitary structure is a unitary ink tank, the fluid is an ink, the one or more cavities are one or more storage cavities configured to store the ink, and the one or more passageways are configured to route the ink to one or more printheads of a printer system.

10. The unitary structure of claim 9, wherein the one or more cavities are a plurality of cavities and the one or more passageways form a network of passageways configured to enable flows of different inks from the plurality of cavities to respective printheads of the printer system.

11. The unitary structure of claim 9, wherein each passageway is sloped to mitigate fluid entrapment in the ink tank.

12. The unitary structure of claim 9, wherein the ink tank is a secondary ink tank configured to supply ink to a primary ink tank of the printer system.

13. The unitary structure of claim 9, wherein the additive manufacturing process is a selective laser sintering process such that the unitary structure consists of a powdered material sintered with a laser to form the unitary structure.

14. The unitary structure of claim 13, wherein the powdered material comprises at least one of a nylon or a polyamide.

15. The unitary structure of claim 13, wherein the powdered material is a glass filled nylon material, which, when sintered to form the ink tank, provides sufficient mechanical stiffness, heat resistance, and dimensional stability to enable operation of the ink tank to supply ink in a printing process of the printer system.

16. The unitary structure of claim 13, wherein the powdered material is chemically compatible with inks that are used by conventional ink tanks that are assembled and sealed to prevent leakage.

17. The unitary structure of claim 9 further comprising:
 a wall thickness that is uniform throughout the unitary structure to maintain mechanical operability in each of a vacuum environment and a pressurized environment.

18. The unitary structure of claim 17, wherein the wall thickness is approximately 3 millimeters.

19. The unitary structure of claim 9, wherein each passageway and storage cavity has a radius of curvature that is sufficient to mitigate fluid entrapment.

20. The unitary structure of claim 19, wherein the radius of curvature is approximately 1 to 6 millimeters.

21. The unitary structure of claim 9, wherein the one or more passageways are interweaved to enable providing a plurality of inks separately to one or more print heads of the printer system without needing secondary sealing of the passageways.

22. The unitary structure of claim 9, wherein the unitary ink tank is treated with a resin to seal a porous surface of the continuous body.

* * * * *